(12) United States Patent
Noach

(10) Patent No.: US 10,289,943 B2
(45) Date of Patent: May 14, 2019

(54) SMART CARD FOR CONNECTION WITH A PERSONAL COMPUTING DEVICE

(71) Applicant: Herzel Noach, Rosh Haayin (IL)

(72) Inventor: Herzel Noach, Rosh Haayin (IL)

( * ) Notice: Subject to any disclaimer, the term of this patent is extended or adjusted under 35 U.S.C. 154(b) by 0 days.

(21) Appl. No.: 15/552,808

(22) PCT Filed: Feb. 21, 2016

(86) PCT No.: PCT/IL2016/050199
§ 371 (c)(1),
(2) Date: Aug. 23, 2017

(87) PCT Pub. No.: WO2016/135720
PCT Pub. Date: Sep. 1, 2016

(65) Prior Publication Data
US 2018/0204102 A1 Jul. 19, 2018

Related U.S. Application Data

(60) Provisional application No. 62/119,280, filed on Feb. 23, 2015.

(51) Int. Cl.
G06K 19/06 (2006.01)
G06K 19/077 (2006.01)
G06Q 20/34 (2012.01)
G06Q 20/40 (2012.01)
G06Q 20/20 (2012.01)
(Continued)

(52) U.S. Cl.
CPC ......... *G06K 19/0772* (2013.01); *G06K 7/003* (2013.01); *G06K 7/0056* (2013.01); *G06K 19/044* (2013.01); *G06Q 20/20* (2013.01); *G06Q 20/34* (2013.01); *G06Q 20/4012* (2013.01)

(58) Field of Classification Search
CPC ............ G06K 19/07749; G07F 7/1008; G06Q 20/341
USPC ................................................. 235/492, 380
See application file for complete search history.

(56) References Cited

U.S. PATENT DOCUMENTS 4,959,788 A * 9/1990 Nagata ................... G06K 19/07
235/379
7,377,448 B2 5/2008 Dan et al.
2004/0033727 A1 2/2004 Kao
(Continued)

FOREIGN PATENT DOCUMENTS

EP 142983 5/1985
WO 2005/086086 9/2005

*Primary Examiner* — Ahshik Kim

(57) ABSTRACT

In some embodiments a secure card is disclosed with a body; and, a plurality of contacts. The contact may be in communication with storage media in the body of the card. The storage media may store identification information for the secure card. The plurality of contacts are optionally disposed proximate to an edge of the body. Optionally the contacts are rounded and/or spaced apart from each other to avoid short circuits when the secure card is placed in a connector. Some embodiments include a connector having interface elements corresponding to each of the card contacts. For example, the connector may connect between the contacts and a computer port. Optionally the card includes an integrated circuit in communication with said storage media and configured for communication in accordance with a standard computer port communication protocol with each of contacts corresponding to a contact of the protocol.

21 Claims, 7 Drawing Sheets

(51) Int. Cl.
*G06K 7/00* (2006.01)
*G06K 19/04* (2006.01)

(56) References Cited

U.S. PATENT DOCUMENTS

| | | |
|---|---|---|
| 2006/0180674 A1 | 8/2006 | Margalit et al. |
| 2006/0278723 A1 | 12/2006 | Dan et al. |
| 2009/0152344 A1* | 6/2009 | Kamada ................ G06Q 20/06 235/379 |
| 2012/0058678 A1 | 3/2012 | Wenngren |
| 2013/0200999 A1* | 8/2013 | Spodak .................... G05B 1/01 340/5.65 |
| 2013/0233924 A1 | 9/2013 | Burns |
| 2014/0024226 A1 | 1/2014 | Augustinowicz |
| 2015/0053771 A1 | 2/2015 | Juetten |

* cited by examiner

SMART CARD FOR CONNECTION WITH A PERSONAL COMPUTING DEVICE

TECHNOLOGICAL FIELD

The present disclosed subject matter relates to a method and an apparatus for processing a transaction in general and in particular to a financial transaction via a payment card having means for coupling to a standard connector such as available on a computerized device, PC, smartphone etc., and a method for using thereof for transferring data to and from a computer device.

BACKGROUND

In the contemporary era of the Internet and advanced electronic systems, there is widespread use of electronic payment cards. Some cards are secured and some are not, depending on the implementation of the transaction in use. On the market there are many types of cards for different uses, such as credit cards, debit cards, stored value memory cards, ATM cards, etc. There are two types of cards: Contact card and contactless card. The contactless card is used for transactions that need no contact means with a reader, etc. The card may include electromagnetic and radio frequency (RF) electronic means for transferring power to the card and for transmitting information from the card.

Using this technology requires a reader that reads the information from the card for further processing. The transaction can be secured or unsecured, depending on the card electronics.

Contact cards require a reading device operating by contacts. The basic contact card has a magnetic stripe, wherein the stripe contains the card information like bank account number, PIN, etc. This card is easily copied and is considered an unsecured card. Another type of contact card is the secured card, also called a smart card. The smart card has an electronic chip implementing a security algorithm, thereby securing the transactions carried out by the card. The specification of smart cards is defined for example by standard ISO 7816. The secured card demonstrates the highest level of security when it comes to card fraud or card copying. Unfortunately, cards fraud is a serious problem for card-issuing companies and also for the users. Among the cards fraud we find the stolen card, copied card and identity theft. The problem of fraud is highly significant when it comes to Internet transactions. The Internet world trading is increasing day by day, as people get more confidence in this way of buying goods. However, the fraud rate increases accordingly. Credit card information transmitted over the Internet may be vulnerable to attacks, as there are many malicious software on the net and maybe also on users' personal computers. Typing in a user's credit card information or giving it over the phone is a possible source for money or identity theft.

GENERAL DESCRIPTION

According to an aspect of the presently disclosed subject matter there is provided a method for conducting a financial transaction through a remote point of sale by a payment card being associated with an identification information and having an electronic circuit integrated therein configured to hold the identification information. The method includes coupling the electronic circuit of the payment card to a corresponding reader configured to read the identification information; and transmitting the identification information to the remote point of sale along with a request for the transaction.

The method can further include verifying that the payment card is unlocked. The step of verifying can include receiving a Personal Identification Number inputted to a computing device coupled to the reader.

The method can further include generating an encryption key for encryption of the identification information, wherein the step of transmitting the identification information includes encrypting the identification information and transmitting the encrypted identification information. The step of generating an encryption key is carried out by an authentication server associated with a payment card company and is sent to the electronic circuit of the payment card via the reader and wherein the encrypting of the identification information is earned out by the electronic circuit of the payment card. The encryption key can be a dedicated key generated for each transaction.

The method can further include receiving the identification information by the remote point of sale, and further transmitting the identification information along with payment information from the remote point of sale to an authentication server associated with a payment card company.

According to another aspect of the presently disclosed subject matter there is provided a system for conducting a financial transaction between a computing device and a remote point of sale. The system includes a payment card being associated with an identification information and having an electronic circuit integrated therein configured to hold the identification information; a connector coupled to the computing device and configured to allow the identification information to be transmitted through the computing device; a transceiver coupled to the remote point of sale and configured to receive, and transmit the identification information.

The system can further include an authentication server associated with a payment card company, the authentication server being configured to receive from the point of sale the identification information along with payment information and to authenticate the identification information. The authentication server can further be configured to receive a transaction request from the point of sale and to generate an encryption key configured for encryption of the identification information by the electric circuit of the payment card.

The connector can include an USB interface configured for coupling to a corresponding USB interface defined on an edge of the payment card. The connector can further include a body having a groove defined along a dimension of an inserting face thereof, wherein the USB interface is mounted inside the groove. The connector can further include a side guide upwardly protruding from the inserting face, such that while the edge of the payment card is inserted into the groove a portion of the payment, card is supported by the guide.

The payment card can include a USB interface wherein the card is of a rectangular shape having four longitudinal edges and the USB interface is defined on one of the longitudinal edges. The USB interface can include rounded contacts, spaced apart from one another, precluding thereby short circuiting when connecting to a corresponding connector.

According to yet another aspect of the presently disclosed subject matter there is provided a card for conducting a transactions. The card includes top rectangular layer and a bottom rectangular layer wherein the top and bottom rectangular layers having four longitudinal edges, an electric circuit disposed between the top and bottom layer and being configured for storing identification information and for receiving an encryption key and generating an encrypted identification information in accordance with the encryption key; and an USB interface defined on one of the longitudinal edges and being coupled to the electric circuit.

The USB interface can include rounded contacts spaced apart from one another, precluding thereby short circuiting when connecting to a corresponding connector.

According to a further aspect, of the presently disclosed subject matter there is provided a method for forming a data transaction from a remote computing device by a smart card being associated with an identification information and having an electronic circuits integrated therein configured to hold the identification information. The method includes coupling the smart card to a corresponding reader configured to read the identification information and transmitting the identification information to the remote computing device along with a request for the transaction.

The term 'transaction' as used herein in the detailed description and claims refers to a financial transaction, data transaction, transaction of identification information etc.

BRIEF DESCRIPTION OF THE DRAWINGS

In order to better understand the subject matter that is disclosed herein and to exemplify how it may be earned out in practice, embodiments will now be described, by way of non-limiting example only, with reference to the accompanying drawings, in which.

DETAILED DESCRIPTION

The presently disclosed subject matter provides according to one aspect a system and a method for forming a financial transaction through a nearby or remote point of sale, for example through an internet site, by a payment card. The payment card can be a credit card, debit card, charge card, or any other bank card being associated with an identification data, such as card number, expiration date, card holder name etc.

The payment card includes an electronic circuit integrated therein, being configured to hold the identification data. The electronic circuit can be such is used in smart card, chip card, any integrated circuit chips on thin PCB, and can be a memory cards. According to an example, the circuit is configured with a USB contacts and communication protocol, for coupling to a corresponding USB port.

According to other example the circuit can be configured with other communication standards such as IIC, Twisted pair, SPI, RS232, IEEE1394 (Firewire), Lightning connector, etc.

According to an example the electronic circuit of the payment card can be configured to encrypt the identification data associated with the card.

Accordingly, forming a financial transaction can be carried out by coupling the payment card to a corresponding reader such that the identification data of the payment card can be received from the electronic circuit of the payment card. Preferably the identification data is encrypted by the electronic circuit of the payment card. The identification data is then transmitted to the remote point of sale along with a request for the transaction. That is to say, if for example the transaction is carried out over the internet and through an internet site displayed by a computer device, the payment card can be coupled to the computer device and the card data can be transmitted to the point of sale associated with the internet site or to the financial institution responsible for carrying out the transaction. Accordingly, the card data does not have to be inserted by the user on the internet site.

It is appreciated that transmission of the data can be earned out in accordance with known standards such as ISO7816, etc.

Figure 1:
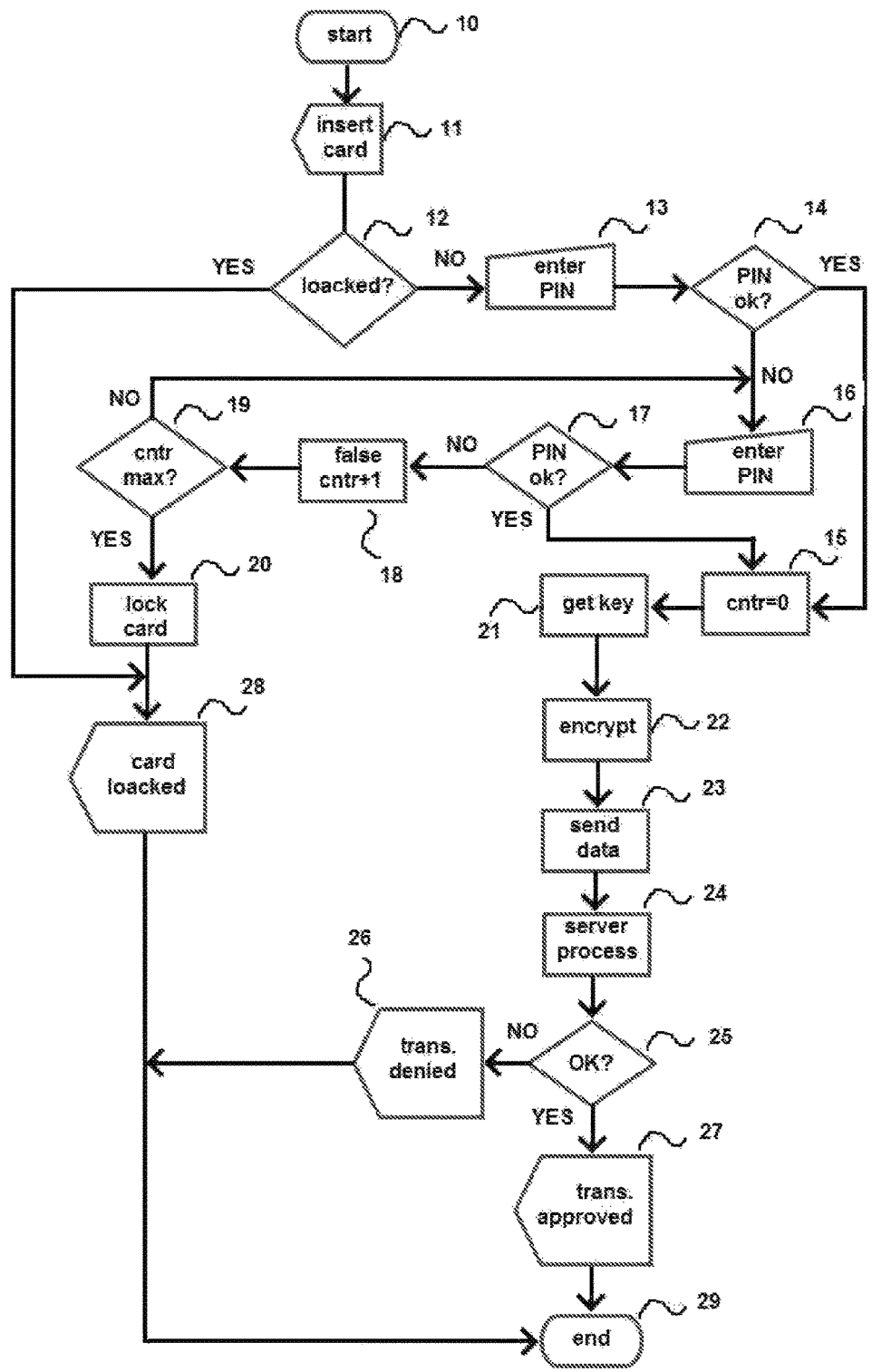
FIG. 1 is a flowchart diagram illustrating a method for performing a financial transaction in accordance with an example of the presently disclosed subject matter.
Figure 2:
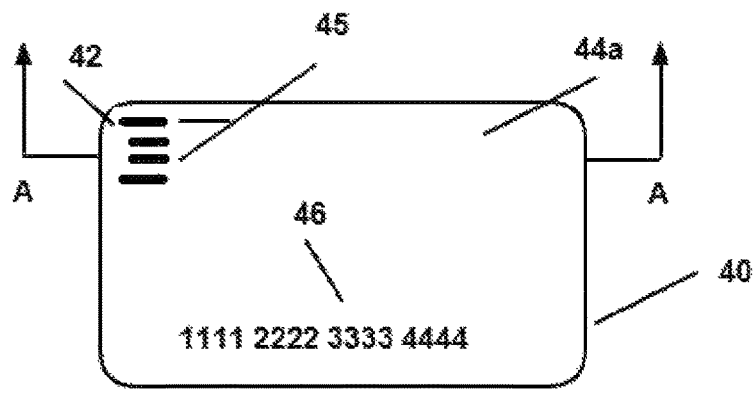
FIG. 2 is a top view of a payment card in accordance with an example of the presently disclosed subject matter.
Figure 3:
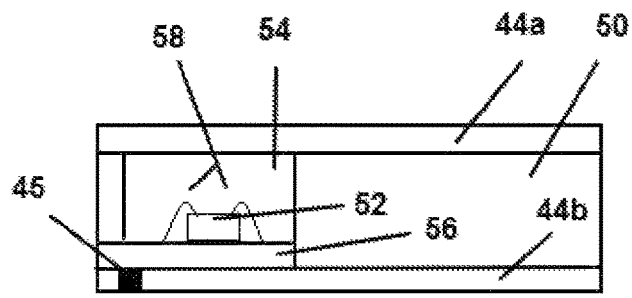
FIG. 3 is a side sectional view of the payment card of FIG. 2 taken along lines A-A.
Figure 4:
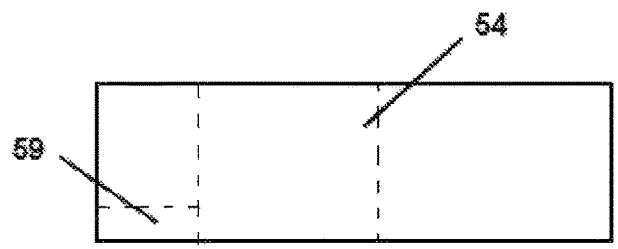
FIG. 4 is a side sectional view of a middle layer of the payment card of FIG. 2 taken along lines A-A.

Attention is now made to the flow chart diagram of FIG. 1, illustrating an example of a method for carrying out a transaction in accordance with the presently disclosed subject matter. The transaction method 10 can be carried out by a private user utilizing his personal computer such as a PC or a smartphone etc, or by a cashier at the store.

When it is desired to carry out a transaction, for example purchase an item over the internet through a website, the user selects to item to be purchased, and proceeds to the checkout page. In the checkout page an instruction is displayed requesting the user to provide the identification information associated with the payment card by coupling thereof to the card reader coupled to the computer (block 11). It is appreciated that the card reader as referred to in the application can be a PC, smartphone, handheld device, or any other computing device. It is further appreciated that in case the computing device is not provided with a port for coupling to the card a dedicated connector can be utilized configured for coupling the payment card to the computing device.

An algorithm is actuated to check if the card is unlocked (block 12), for example in case of previous false PIN (Personal Identification Number) entering. The user is prompt to enter the PIN associated with the payment card (block 13). An algorithm is actuated to receive data from the card and verify that the correct PIN is inserted (block 14). It is appreciated that verifying the PIN can be earned out also by transmitting the data to a financial institution associated with the payment card. In addition, if the correct PIN data is entered the data can be used to reset false counter (block 15). Once the PIN is verified the authentication server generates in response an encryption key, and sends it to the card (block 21).

In case the PIN is found to be incorrect the user is prompt to enter the PIN again (block 16) following which the PIN is verified again (block 17). A counter can be provided counting the amount of attempts to enter the correct PIN (blocks 18 and 19), and to lock the card in case the amount of attempt reached a predetermined number (block 20). In the latter case a notification can be displayed informing the user that the card is locked (block 28).

Once the PIN is cleared the payment card receives an encryption key from the authentication server (block 21) and the card encrypts the card data therewith (block 22).

The encrypted data is transmitted to the authentication server by the computer (block 23), where it is processed (block 24) together with data regarding to account associated with the payment card. The server verifies if the data is acceptable, i.e. the card data matches, and the account has sufficient funds or credit for carrying out the transaction (block 25) following which the authentication server either denies (block 26) or approves the transaction (block 27).

It is appreciated that the above method can be modified so as to adapt to various smart cards, or to demands from business enterprises, or standard requirements. In addition, the encryption process described herein above relates to asymmetric key algorithm which can be modified for other encryption methods. The encryption process can include providing a dedicated encryption key generated for each transaction, such that the encryption key is different for each transaction.

It should be noted that above steps assumes the payment card is not provided with an input device, such as keyboard. Reference is now made to FIGS. 2 through 5A, according to an example the payment card 40 can be provided with an electronic chip integrated therein. The electronic chip can be coupled to interface means for coupling to a corresponding reading means, here illustrated as USB interface 42. The USB interface is disposed at the edge of the card such that it can be coupled to a corresponding USB port, as explained in detail hereinafter with regards to FIGS. 6, 7 and 8.

It is appreciated that the USB interface can be defined on any side along the width or the length of the card, or close to one of the corners thereof. According to an example, the payment card 40 includes a top layer 44a and a bottom layer 44b, both of which can be made of a plastic material such as PVC or ABS or any other material like paper etc., and can include embossing, and a magnetic strip (not shown). The bottom layer 44b further includes at the edge thereof, or in close proximity thereto, four USB contacts 45 forming together the USB interface 42. It is appreciated that embossing can be replaced by printing card details like account number, expiration date etc, using any adequate stable color.

The payment card further includes a middle layer 50 configured to hold therein a PCB (Printed Circuit Board) 56 having an IC (Integrated Circuit) chip 52, for example inside a bore 54 formed therein. The bore 54 can be formed at any location of the middle layer 50, such that the IC 52 does not interfere with other elements of the cards, i.e. the embossing, etc. The IC 52 can be configured to hold the data related to the card, and to allow an external reading means to receive the data therefrom. According to the illustrated example the PCB is configured with an electronic chip 52, which is configured in accordance with a USB communication protocol.

The middle layer 50 further includes a depression 59 extending between the bore 54 and the edge there of for dipping the PCB. Wires bonding 58 from the IC to PCB are extended through PCB layout towards the USB—interface 45 disposed at the edge of the middle layer 50.

The IC 52 and the bonding wires 58 go through small dab of potting compound to protect the die and the wires from damages.

Coupling the electronic circuit inside the card with outside layers 44a and 44b can be any know process of lamination like hot or cold lamination, gluing with adhesive, ultrasonic etc.

According to an example the payment card have a total thickness of 0.8 mm, which cars be achieved by using thin layers for 44a and 44b, thin PCB 56 and wafer grinding, such that it can be used as a regular payment card with magnetic strip as well, as a smart card having a USB interface.

It is appreciated that according to other examples of the presently disclosed subject matter, the USB or any other wired communication standard interface can be integrated in the PCB, such that the PCB is located at any convenient place on the card, whilst the electrical contacts are defined near the edge of the payment card, allowing the corresponding contacts for example, to be coupled to the USB interface.

Figure 10:
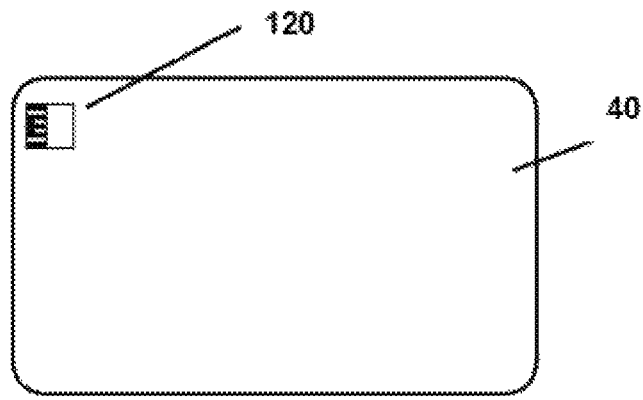
FIG. 10 is a top view of a payment card in accordance with another example of the presently disclosed subject matter.
Figure 11:
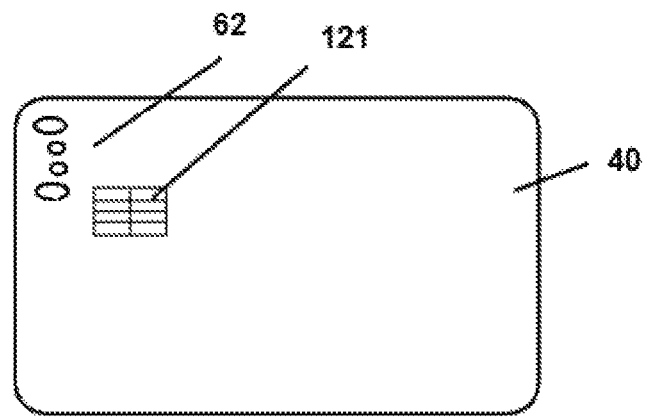
FIG. 11 is a top view of a payment card in accordance with another example of the presently disclosed subject matter.
Figure 12:
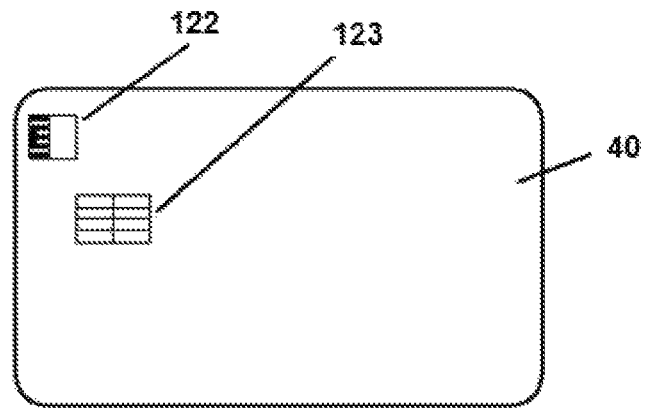
FIG. 12 is a top view of a payment card in accordance with another example of the presently disclosed subject matter, and, FIG. 13 is a top view of a payment card in accordance with yet another example of the presently disclosed subject matter.

According to a further example, as shown in FIG. 10, the IC can be an electronic smart chip 120 having a USB interface integrated therein as a module. The chip is located in close proximity of the card edge, so as to allow corresponding USB connector to be coupled thereto. In another embodiment, as shown in FIG. 11, the chip integrated into module 121 can be configured to conform to any standard for example a standard related to electronic smart cards, such as ISO7816 compliant and the like having USB interface integrated therein. The chip can include a cryptographic engine, or an ASIC (Application Specific Integrated Circuit) with a cryptographic engine. According to yet a further example as shown in FIG. 12, the payment card can include an electronic smart chip integrated into module 122 having a USB interface as well as an ISO7816 compliant module 123.

Figure 13:
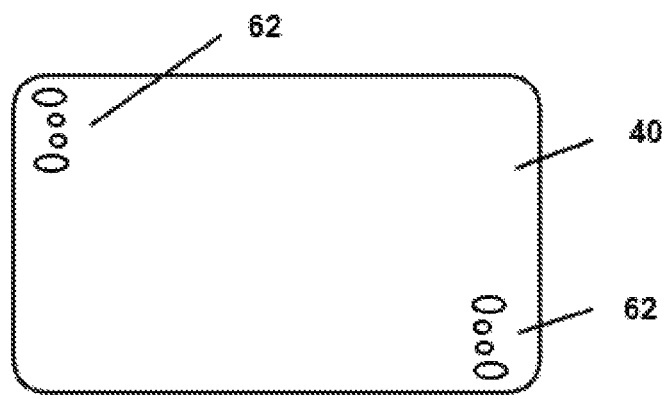

According to another example, shown in FIG. 13 the card can have two USB complaint contacts, or other communication standards disposed on one or two sides of the card along the circumference, to form secured communication between two computerized devices. This way, a first computing device can be coupled to the USB complaint contacts while a second computing device is coupled to the second USB complaint contacts, such that the card transfers data between the first and second computing devices. The data can be encrypted by the card, such that if, for example, the first computing device is connected to the internet, data from the internet can be transferred to the second computing device through the card, precluding thereby an access of a malicious software, such as a computer warm.

It is appreciated that the PCB can be configured to include additional electronic components as required.

According to a further example, the USB interface on the payment card can include two contacts on one face of the card, and two contacts on the opposite face thereof. Accordingly, the PCB or the chip inside the card is coupled to both the top later and the bottom layer. Dividing the contacts of the USB interface to two different faces of the payment card allows disposing the contacts such that they are spaced apart from one another precluding thereby undesired short circuiting that may occur when the corresponding USB connector is coupled thereto. In addition, since the payment card includes a large amount of elements such as embossing, hologram, etc., it thus particularly useful to divide the contacts such that two contacts are disposed on one face and two on the opposite face, such that more degree of freedom is provided when locating the contacts on the card. It is further noted that dividing the contacts to the two faces of the payment card may facilitate forming larger distance between contacts, such which ensures safe insertion of connector to card by end user. It is appreciated that accordingly the connector and the card contacts can be configured for safe operation of an unskilled user during personal transaction.

According to another example the contacts can be configured for side sliding into the reader for example the contacts can include a dome shape.

Figure 5A:
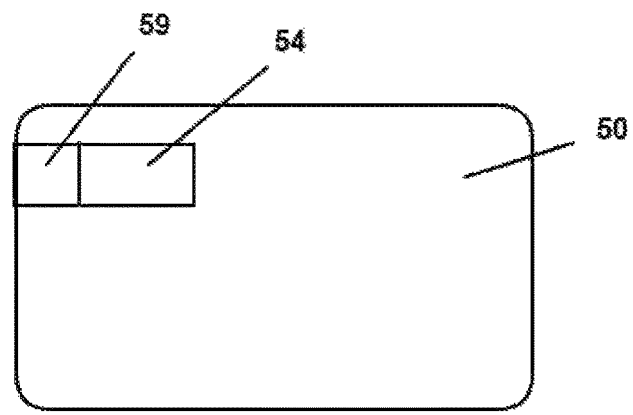
FIG. 5A is a top view of the middle layer of the payment card of FIG. 2.
Figure 5B:
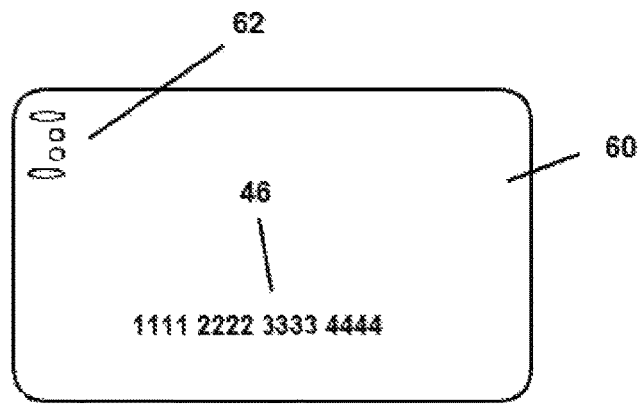
FIG. 5B is a top view of a payment card in accordance with another example of the presently disclosed subject matter.

According to another example, shown in FIG. 5B the contacts on the payment card 60 can be rounded contacts 62, defined such that they are spaced apart, precluding thereby short circuiting when connecting to a corresponding connector. The rounded contacts allow forming a small dimension contacts, thus better utilizing the space on the card. This way, the payment card can be coupled to a connector which is not provided with guides from both sides of the card, such as shown and described herein below with reference to FIGS. 6 to 9. The round contacts may also apply to other cards as shown in FIG. 10 and FIG. 12.

The dimensions of the payment card can be similar to a standard payment card such that can be inserted into conventional magnetic or smart chip readers. Thus the card thickness can be 0.8-0.85 millimeters. The pitch of the contacts can have standard values such as 0.025" (inch), 0.05", 0.1", 0.156".

However, it is appreciated that if the smart card is to include a display and/or data input means, the thickness of the card may be increased.

According to another sample the payment card can include a larger number of contacts, so as to conform to other communication standards, as required.

Optionally, the card can include a light emitting diode (LED). The LED can be used to indicate that the card is connected properly to a power source and is ready for operation. The LED can be configured to emit more than one light range, such that one light indicating various conditions, such as one light indicated the payment card is connected, and another light indicating the transaction is verified.

The payment card can include an alphanumeric display using, for instance, a flexible Liquid Crystal Display (LCD) device. Furthermore, the card can include data input means, such as a keypad, a membrane switch, a tactile switch or a touch screen. In this case, transaction details entered via the data input means may also be sent in encrypted form to a POS or over the Internet.

The payment card can also include biometric identification means for ensuring that only the card owner will use the card.

It is appreciated that the payment card can be adapted to various communication standards such as, USB, IIC, Twisted pair, SPI, RS232, IEEE1394 (Firewire), Lightning connector, etc., to support a wide variety of applications and users' needs. Contacts on the card can be allocated accordingly.

It is further appreciated that the card can be configured to be used in conjunction with various types of USB connectors, such as standard A, Standard B, mini A, mini B, micro A, Micro B, mini AB, micro AB, VC-E6, etc. and the contacts on the card can be configured accordingly.

Optionally the payment card can be configured to perform wireless communication complying to known standards for example ISO/IEC14443, in addition to a wired communication. Optionally, the card can be configured to communicate with Wireless USB (WUSB). The card can include input means, like keypad, membrane switch, touch screen. Tactile switch etc, and output means like, alpha numeric display, 7-seg, flexible LCD display to transfer all transaction details, like amount, number of payments etc. In such case the thickness of the card can be larger than 0.8 mm.

In addition, the payment card can be used for data storage with or without encryption, such as a medical card and ID card with picture or any other printing information.

It should be understood that according to an example the payment card can include other communication means and verifying means such a magnetic stripe, hologram, etc., as known and used in payment cards.

The payment card can thus be utilized for performing secure financial transactions at transaction points such as a POS. The financial transactions can include payments, cash withdrawals, funds transfers from one account to another, or any other transaction as known in the art.

Figure 6:
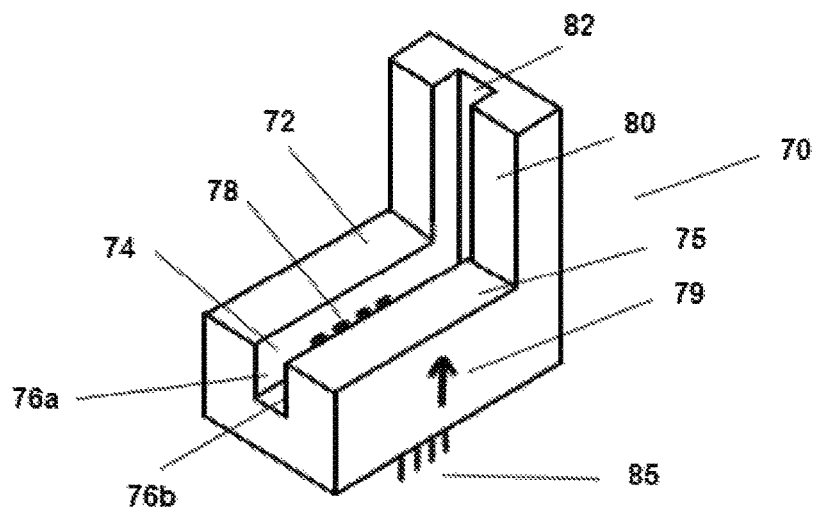
FIG. 6 is a perspective view of a connector for coupling a payment card thereto, in accordance with an example of the presently disclosed subject matter.

Reference is now made to FIG. 6, a connector 70 can be provided for coupling a USB interface on a payment card, such as shown in FIGS. 2 through 5. The connector 70 includes a body 72 having a groove 74 defined along a dimension of an inserting face 75 thereof. The groove 74 is configured to allow insertion of a portion of a payment card therein through the insertion face 75 of the body 72. The groove 74 is defined between two inner walls 76a and 76b one of which having contacts 78 protruding therefrom. The contacts 78 can be spring type such that the contacts are forwardly biased allowing thereby an electric coupling to the contacts defined on the face of the payment card. In addition an indication such as an arrow 79 can be molded on the connector or printed showing the correct mounting direction into the card.

The connector 70 further includes a side guide 80 upwardly protruding from the inserting face 75, such that a side edge of the payment card inserted into the groove 74 is supported thereby. The side guide 80 can include a depression 82 defined along the length thereof extending towards the groove 74, such that a side edge of a payment card can be slid therethrough facilitating the insertion thereof inside the groove 74. The side guide 80 can be extended such that when the card is inserted inside the groove 74 half of the length of the card or more is supported by the side guide 80.

It is appreciated that the size of the dimensions of the inserting face 75 of the body 72 can be such that allow engaging only a portion of the edge of the payment card.

That is to say, the payment card is provided with an electric contact interface, such as USB interface, defined on one side edge thereof. Thus the coupling edge of the card can be configured to be inserted into a corresponding connector. Accordingly, the connector 70 can be configured to allow only a portion of the coupling edge to be inserted thereto, such as the portion on which the contacts are defined. For example, if the contacts are defined on the side of the coupling edge of the payment card, the body 72 can have a dimension configured in accordance with the size of the contacts, such that only the contacts and the immediate surroundings thereof is inserted into the groove 74.

Accordingly, the connector can be of a small dimension, and can be provided with a side guide 80 facilitating thereby the insertion of the contacts into the groove. The side guide 80 and the depression 82 are further configured to ensure that the contacts on the payment card are aligned with the contacts 78 defined inside the groove 74.

The connector 70 further includes contacting pins 85 for wiring, extending therefrom and being configured to be coupled to a computing device, such as a PC, smart phone, tablets, etc. according to an example the contacting pins 85 are incased in a cable, terminated in a contact member, such as a USB and the like, being configured to be coupled to a corresponding port on the computing device.

Pins 85 can be of any known shape like straight, 90°, flat cable connection etc.

This way, the connector 70 can be utilized as a reading/writing device for establishing communication between the payment card and the computing device. The payment card can thus be provided with corresponding contacts thereon, such as USB contacts and can be readily coupled to the computing device by the connector 70.

Figure 7:
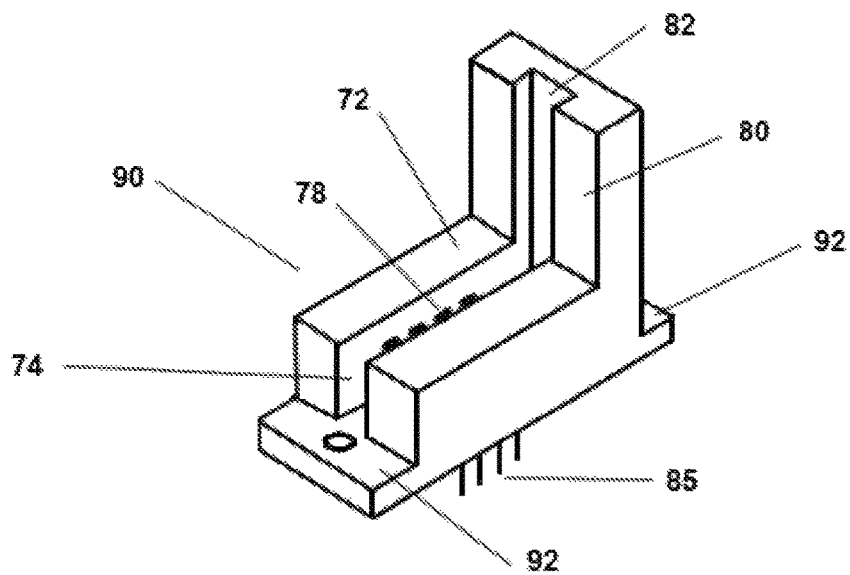
FIG. 7 is a perspective view of a connector for coupling a payment card thereto, in accordance with another example of the presently disclosed subject matter.
Figure 8:
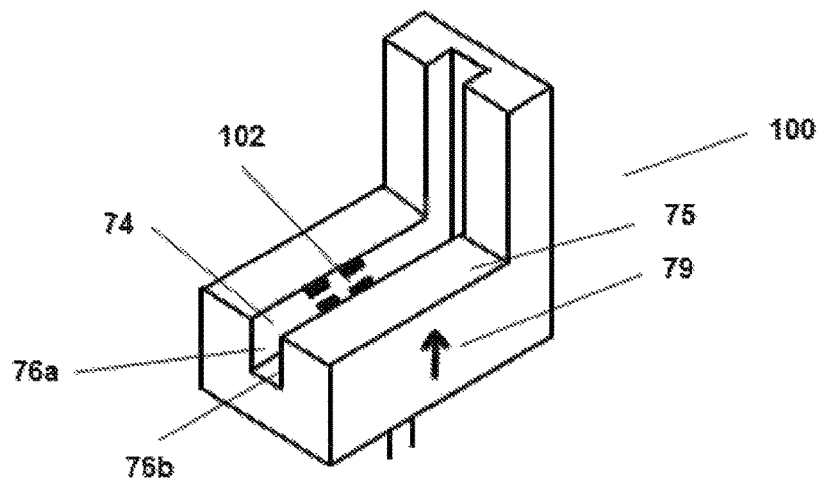
FIG. 8 is a perspective view of a connector for coupling a payment card thereto, in accordance with yet another example of the presently disclosed subject matter.

Reference is now made to FIGS. 7 and 8 showing examples of connectors according with other examples, wherein like elements are designated like numeral references. FIG. 7 shows a connector 90 including a body 72 defining a groove 74 having contacts 78 therein, and a side guide 80 having a depression 82. According to this example the connector 90 is further provided with a pair of mounting wings 92 configured for mounting thereof to a surface. This way the connector 90 can be securely disposed on a surface, such as a POS, facilitating thereby insertion a payment card therein.

It is appreciated that since the connector 90 is configured to be mounted, thus facilitating insertion of the payment card therein, it can be provided with or without the side guide 80.

Furthermore it is appreciated that one or more aligning keys can be provided on the card configured to ensure precise alignment of the contacts on the card with the connector 90.

As shown in FIG. 8 a connector 100 can be configured with contacts 102 inside the groove 74, however defined on both inner walls 76a and 76b thereof. The connector 100 according to this example can be configured to allow connecting thereto a payment card having contacts on two faces thereof, such as described hereinabove.

Figure 9:
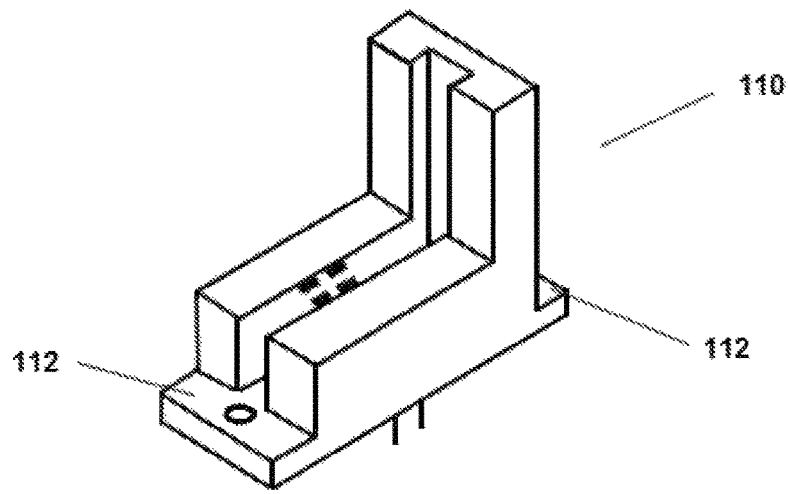
FIG. 9 is a perspective view of a connector for coupling a payment card thereto, in accordance with yet another example of the presently disclosed subject matter.

As further shown in FIG. 9 a connector 110 can be configured with contacts inside the groove defined on both inner walls as shown in the Example of FIG. 8, and can be provided with a pair of mounting wings 112 configured for mounting thereof to a surface. It will be appreciated by those skilled in the art that the connectors described hereinabove can be made of a small dimensions thus can be carried in the user's pocket, a briefcase or hand bag, or can be kept in a drawer at home or at work.

In addition the connector can be permanently coupled to a port in the computing device. That is to say, the connector can be for example coupled to a USB port of a PC and can be readily available to insert a payment card thereto. This way, a user wishing for example to purchase an item from a remote POS for example over the internet, by using his personal computing device, can insert his/her payment card to the connector which is coupled to the computing device. The payment card data is automatically transferred and verified, for example in accordance with the method described herein above with regards to FIG. 1. This way, the user does not have to input the payment card data manually, and does not expose the payment card data to theft and fraud.

It is further appreciated that the connector of the presently discloses subject matter can be configured as a passive member, thus consuming negligible energy compared with magnetic strip readers or smart card readers, which have active components, and require larger plastic parts, PCB, interfacing connection and LED or other display means.

According to an example, the connector can be embedded in a computer keyboard, or a mouse, such that the USB interface thereof can be inserted to a groove formed on the keyboard or the mouse. Alternatively, the connector can be embedded in a computing device, such as a desktop, laptop or handheld device.

According to an aspect of the presently disclosed subject matter a smart card for allowing remote access to personal information is provided. The card can be used for accessing medical information from a remote location. The smart card can be coupled to a connector which is connected to a computing device. A PIN is inputted to the computing device, verifying thereby the owner of the smart card. In order to allow access to data on a remote server, the computing device reads encrypted identification information processed on the smart card and transmits it to an authentication server on the remote server.

According to an example, the identification information can be encrypted before transmitting thereof. According to a further example, the encryption key can be generated by the authentication server on the remote server, and can be transmitted to the card via the computing device, such that the card encrypt the identification information in accordance with the generated encryption key.

Those skilled in the art to which the presently disclosed subject matter pertains will readily appreciate that numerous changes, variations, and modifications can be made without departing from the scope of the invention, mutatis mutandis.

The invention claimed is:

1. A secure card comprising:
    a body;
    a plurality of contacts in communication with storage media in the body, the storage media for storing identification information for the secure card, and through which the identification information is readable, the plurality of contacts disposed proximate to an edge of the body and wherein the contacts are spaced apart from each other to avoid short circuits when the secure card is placed into a connector including a respective interface element corresponding to each of the contacts, to facilitate reading of the identification information via the contacts; and
    an integrated circuit in communication with said storage media and configured for communication in accordance with a standard computer port communication protocol over the plurality contacts with each contact of said plurality of contacts corresponding to a contact of the protocol
    wherein said plurality of contacts include four contacts and said standard computer port communication protocol includes a USB protocol configured to communicate over said four contacts of said plurality of contacts; said four contacts corresponding to four contacts of said protocol.

2. The secure card of claim 1, comprising a smart card and wherein the body is dimensioned in accordance with the ISO 7816 standard.

3. The secure card of claim 2, wherein the plurality of contacts disposed proximate to said edge of the body, are additionally disposed proximate to a corner of the body.

4. The secure card of claim 1, wherein at least one of said plurality of contacts is rounded.

5. The secure card of claim 1, wherein a total thickness of the card is not more than 0.85 mm.

6. An identification system comprising:
a secure card comprising:
a body,
a plurality of contacts in communication with storage media in the body, the storage media for storing identification information for the secure card, and through which the identification information is readable, the plurality of contacts disposed proximate to an edge of the body, and
an integrated circuit in communication with said storage media and configured for communication in accordance with a standard computer port communication protocol over the plurality contacts with each contact of said plurality of contacts corresponding to a contact of the protocol; and,
a connector for interfacing with the secure card to facilitate reading of the identification information via the contacts, the connector including interface elements corresponding to each of the contacts and spaced apart from each other to avoid short circuits, and, to facilitate reading of the identification information via the contacts and configured for communicating with a computing device,
wherein each of the contacts is spaced apart from each other to avoid short circuits when the secure card is placed in said connector,
wherein the connector is configured for receiving the secure card such that each of the contacts of the secure card aligns with a corresponding interface element for data communication therebetween, to facilitate reading of the identification information
wherein, the plurality of contacts of the secure card includes four contacts; and the connector includes four contacting pins configured to be coupled to a USB port; and
the interface elements include four interface elements positioned on the connector to contact a corresponding contact, each of the four interface elements in communication with a corresponding one of the four contacting pins.

7. The system of claim 6, wherein the connector further includes a connector body having a groove defined along a dimension of an inserting face thereof, wherein the interface is mounted inside said groove.

8. The system of claim 7, wherein the connector further includes a side guide upwardly protruding from said inserting face, such that while the edge of said secure card is inserted into the groove, a portion of the secure card is supported by the guide.

9. The system of claim 8, wherein the connector includes the interface on one side of the groove and the other side of the groove is configured to protect a magnetic strip of the secure card.

10. The system of claim 6, additionally comprising:
a transceiver device coupled to a remote point and configured to receive and transmit the identification information to and from the computing device over a communications network.

11. The system of claim 10, wherein the transceiver is configured for transmitting an encryption key over the communications network to the secure card coupled to the connector, over the communications network, to encrypt the identification information, in response to the transceiver receiving a transaction request associated with the secure card.

12. The system of claim 11, wherein the transceiver is configured for receiving the encrypted identification information from the secure card over the communications network, as transmitted from the first computing device communicating with the connector coupled to the secure card.

13. The system of claim 12, wherein the transceiver is configured for transmitting the encrypted identification information to the remote point and the transceiver is configured for data communication with an authentication server configured for verifying that the received identification data information from the transceiver over the communications network is from the secure card associated with an identification transaction at the remote point.

14. The system of claim 6, wherein the secure card comprises a smart card and wherein the body is dimensioned in accordance with the ISO 7816 standard.

15. The system of claim 6, wherein at least one of said plurality of contacts is rounded.

16. A secure card comprising:
a body;
a plurality of contacts in communication with storage media in the body, the storage media for storing identification information for the secure card, and through which the identification information is readable, the plurality of contacts disposed proximate to an edge of the body and wherein the contacts are spaced apart from each other to avoid short circuits when the secure card is placed into a connector including a respective interface element corresponding to each of the contacts, to facilitate reading of the identification information via the contacts; and
an integrated circuit in communication with said storage media and configured for communication in accordance with a standard computer port communication protocol over the plurality contacts with each contact of said plurality of contacts corresponding to a contact of the protocol
wherein for each contact of said plurality of contacts there is a path with no other contact intervening between said each contact and said edge of the body.

17. The secure card of claim 16, wherein said standard computer port communication protocol includes at least one member of the group consisting of USB, IIC, Twisted pair, SPL, RS232, IEEE 1394 (Firewire), Lightning connector.

18. The secure card of claim 16, comprising a smart card and wherein the body is dimensioned in accordance with the ISO 7816 standard.

19. The secure card of claim 18, wherein the plurality of contacts disposed proximate to said edge of the body, are additionally disposed proximate to a corner of the body.

20. The secure card of claim 16, wherein at least one of said plurality of contacts is rounded.

21. The secure card of claim 16, wherein a total thickness of the card is not more than 0.85 mm.

* * * * *